United States Patent Office 3,493,342
Patented Feb. 3, 1970

3,493,342
COLLECTION OF PYROGENIC TITANIUM
DIOXIDE PIGMENTS
Howard Weaver and Robert B. Roaper II, Ashtabula, Ohio, assignors to Cabot Corporation, Boston, Mass., a corporation of Delaware
Filed Feb. 16, 1968, Ser. No. 705,979
Int. Cl. C01g 23/04
U.S. Cl. 23—202                                     5 Claims

ABSTRACT OF THE DISCLOSURE

The present invention relates to an improved method for the collection of pyrogenic titanium dioxide pigment from suspension in reaction product gas streams by filtration of such streams through porous fabric. Broadly, the invention comprises the injection of water into the suspension prior to filtration thereof. Said procedure substantially reduces the tendency of the pigment to occlude or "blind" the porous fabric and is particularly beneficial when applied to bag filtration processes.

---

Figure 1:
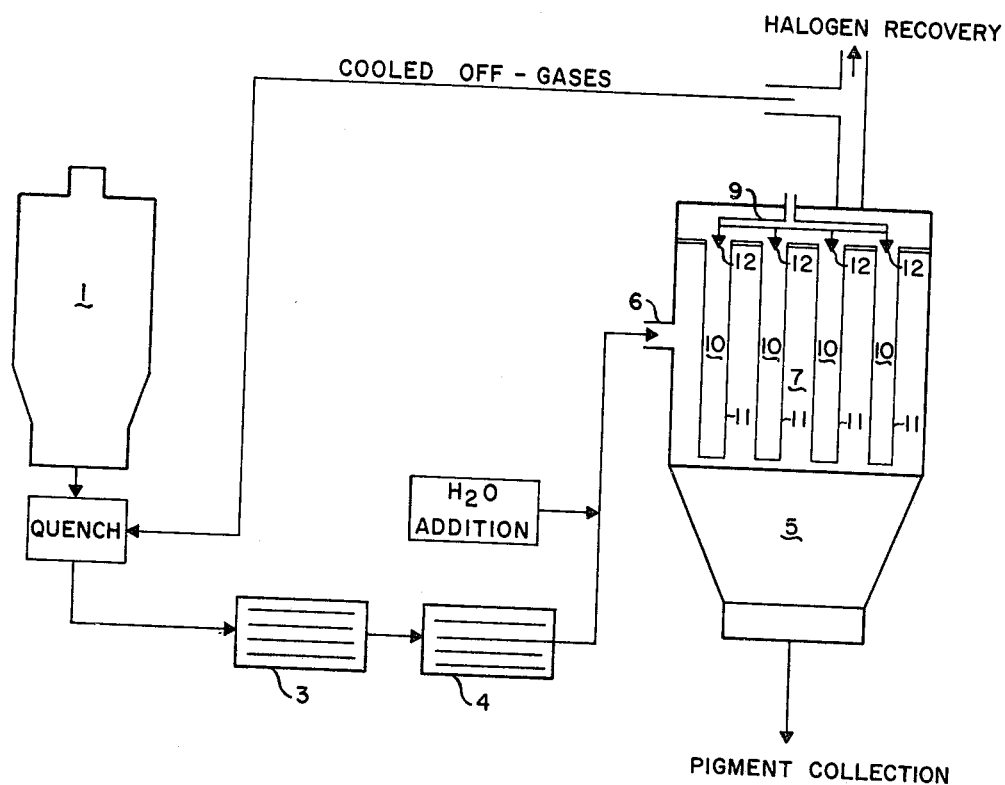

Pyrogenic titanium dioxide pigment is produced by the high temperature oxidation (above about 1450° F.) of a volatilized titanium halide, generally titanium tetrachloride. In commercial scale operations said oxidation reaction is not normally sufficiently exothermic to maintain the desired reaction temperatures; accordingly, additional heat is generally supplied to the oxidation reaction zone such as by burning a fuel gas therein. The resulting reaction zone effluent, comprising the pigmentary product suspended in various gaseous by-products is then cooled and thereafter charged into suitable collection apparatus wherein the solid pigment product is separated and collected from said gaseous by-products. One type of apparatus which has found favor in the collection of titanium dioxide pigments from suspension is generally known as a bag filter. Said apparatus typically comprises a chamber in which there are supported a plurality of cylindrical vertically oriented filter bags. Said bags are constructed from a porous material, normally a felt-like fabric, which prevents the passage therethrough of the solid particles desired to be collected but is sufficiently permeable to allow the gaseous components of the suspension to flow therethrough without substantial hindrance. Thus, the feedstock suspension is charged into the chamber wherein the pigmentary portion of the suspension is retained while the gaseous components thereof flow through the filter bags and are thereafter exited from the apparatus and treated as desired. Additionally, the oxidation of the titanium halide results in halogenous by-product which generally forms a substantial portion of the reaction zone effluent. Thus, it is often desirable that the off-gases from the pigment collection apparatus be subsequently subjected to a halogen recovery step prior to being vented off or otherwise discarded. The solid pigment trapped within the chamber is normally collected from the bottom portion of the chamber. Further, since the pigment particles often tend to "cake" on the exterior surfaces of the filter bags, there is also generally provided suitable means for periodically distorting the filter bags and/or momentarily disturbing the process stream flow in order to purge said cake from the filter bags. One such method for so purging the filter bags comprises periodically pulsing a gas into the interiors thereof. In the collection of pyrogenic titanium dioxide pigment from the associated reaction gases it has been the prior art experience that the filter bags forming part of the bag filter collection apparatus often tend to occlude or "blind" distressingly rapidly despite the use of such purging methods. Said occlusion or "blinding" is evidenced by a substantial rise in the pressure drop across the bag filter apparatus. Obviously, when said pressure drop increases the power requirements to move a given volume of reactor effluent through the bag filter at a constant rate also increases. Often, the occurrence of said blinding of the filter bags is sufficiently extensive that a reduction in the oxidation reactor throughput is required in order to maintain operations at a reduced volume rate through the collection apparatus.

Accordingly, it is a principal object of the present invention to provide an improved method for the collection of pyrogenic titanium dioxide pigment from suspension in reaction gases.

It is another object of the invention to provide a method for collecting pyrogenic titanium dioxide pigments from suspension in reaction gases by means of a bag filter apparatus which method largely avoids deleterious occlusion of the filter bag elements thereof.

It is still another object of the invention to provide an improved bag filtration collection process for separating pyrogenic titanium dioxide pigments from suspension in reaction gases at an unusually uniform pressure drop across the collection apparatus.

Other objects and advantages of the present invention will in part be obvious and will in part appear hereinafter.

Figure 2:
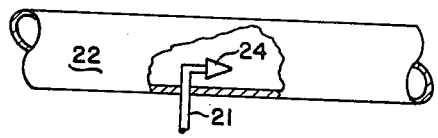

A better understanding of the improved process of the present invention can be had by reference to the drawings forming part hereof wherein there is provided in FIGURE 1 a diagrammatic representation of a flow sheet depicting a typical bag filter collection system in a pyrogenic titanium dioxide producing process; and, in FIGURE 2, a side elevation, partly in section, of a conduit bearing suitable injection means for the practice of the invention.

Referring now to said FIGURE 1 there is produced in reactor 1 pyrogenic titanium dioxide pigment by oxidation of a volatilized titanium halide. As mentioned herein before, auxiliary heat is normally supplied to the reaction zone such as by the combustion of a fuel gas (such as carbon monoxide) therein. Moreover, several adjuvants are known which beneficially effect the ultimate properties of the pigment product when introduced into the oxidation reaction zone. Accordingly, the addition of such adjuvants as potassium, silicon, aluminum, water forming compounds etc. in minor amounts, i.e. less than about 5 wt. percent of the total solid product is also generally practiced and is specifically contemplated within the scope of the present invention. In any case, the effluent stream from said oxidation reactor comprises titanium dioxide pigment suspended in various gaseous by-products of the oxidation and combustion reactions. The temperature of said stream is normally above about 2000° F. A material balance of the gases existing a typical pyrogenic titanium dioxide producing reactor utilizing TiCl₄ as the pigment producing feedstock are shown in Table I below:

TABLE I

| | Vol. percent |
|---|---|
| $Cl_2$ | 50 |
| $N_2$ | 10 |
| $CO_2$ | 25 |
| $O_2$ | 15 |
| $AlCl_3$ | .02 |
| $TiCl_4$ | .04 |

The effluent gas stream containing the suspended pigment is then cooled to between about 100° F. and about 600° F. by any suitable means. It is known that it is deleterious to the ultimate product quality of the pigment to allow an extended residence time thereof in an environment of over about 1400° F. A suitable method for rapidly quenching the oxidation reaction zone effluent to below about 1400° F. comprises charging an amount of cooled reactor off-gases into the hot reactor effluent. In order to prevent excess increase in the gas volume of the effluent suspension, however, it is desirable that only enough of said cooled off-gases be recycled so as to quench the effluent to just below the temperature at which deleterious pigment properties result. The second stage of the cooling step i.e. the further cooling of the effluent to between about 100 and 600° F. is normally accomplished by means of heat exchangers 3 and 4.

The thus cooled reactor effluent is next charged through inlet 6 into chamber 7 of bag filter 5. The pigment laden gases course throughout said chamber and the pigment component thereof is trapped therein while the gaseous components pass through filter bags 10. The pigment collected on exterior surfaces 11 of said bags drops therefrom, generally aided by repressuring or mechanical devices which periodically disturb said filter bags and/or the gas flow therethrough. In the present illustration, gas is charged into manifold 9 and is periodically discharged or pulsed through nozzles 12 into the open ends of filter bags 10. The resulting disturbance of filter bags created by said gas pulses effects purging of exterior surfaces 11 of eccreted material. However, in spite of the use of such purging methods the collection of pyrogenic titanium dioxide pigment in bag filter apparatus has nevertheless often been hindered by blockage or blinding of the bags which, in turn, results in excessive pressure drop across the apparatus and in vastly reduced collection capacity. In accordance with the present invention, however, this problem has been vastly alleviated by the injection of water into the pigment laden gas stream prior to the entry thereof into the bag filter. Another advantage accruing from the practice of the instant invention resides in markedly improved filter bag service life.

The particular manner in which the water is injected into the cooled reactor effluent stream is not generally critical provided that good mixing of the water with said stream is effected. Many methods for accomplishing said injection will be recognized as satisfactory by those skilled in the art. We have found, for instance, referring now to FIGURE 2, that water can be suitably injected through pipe 21 and nozzle 24 into the cooled stream flowing within conduit 22. The particular point at which said water is added to the cooled reaction zone effluent stream is not generally critical provided that said stream has been cooled to below about 600° F. Accordingly, in the generalized flow diagram shown in FIGURE 1, said water injection can be advantageously accomplished at any point between heat exchanger 4 and bag filter 5. If said water is injected into the effluent stream at temperatures substantially above about 600° F., e.g. 800° F., undesirably excessive reaction of said water with the halogen component of said stream can occur. Finally, while it is generally entirely suitable to charge the water in liquid form into the cooled reaction zone effluent stream it will generally be found to be preferable, in terms of ease of accurate metering, etc, to vaporize the water and thereafter inject water vapor or steam into the effluent stream.

The amount of water to be injected into the cooled reaction zone effluent stream is also subject to considerable variation and is dictated, to a large extent, by the concentration of titanium and aluminum halides present in said stream. For instance, we have found that the injection of as little as about 50% of the total amount required to stoichiometrically react with the titanium and aluminum halides present in the effluent stream can provide a marked decrease in the tendency of the filter bags to blind. However, it is preferred that the amount of water utilized represent at least 75% of said stoichiometric equivalent. It is desirable, however, to avoid the injection of substantial excesses of water because of the generally corrosive nature of wet halide gases normally formed thereby.

As indicated in Table I, the total concentration of titanium and aluminum halides present in a typical reaction zone effluent of a pyrogenic titanium dioxide producing process is normally exceedingly low. However, in large measure, our invention is based on the discovery that the presence of even trace amounts of titanium and/or aluminum halides are causal factors in the filter blinding phenomenon. The concentrations of these halides can be determined, for instance, by chromatographic analysis of the effluent gas stream or, if desired, theoretically, by analysis of the reaction equilibria and kinetics of the titanium halide oxidation reaction under the particular conditions practiced.

There follow a number of illustrative non-limiting examples:

EXAMPLE I

In accordance with a process flow diagram substantially as shown in FIGURE I there is continuously produced in reactor 1 a suspension comprising pyrogenic titanium dioxide pigment and associated reaction gases at the respective rates of about 5,000 lbs./hr. titanium dioxide and about 92,000 s.c.f.h. reaction gases. The titanium compound utilized as the feedstock was titanium tetrachloride. Additionally, there was charged into the reactor about 100 lbs./hour of aluminum chloride adjuvant. The reaction zone effluent was quenched from about 2300° F. to about 1300° F. substantially immediately upon exiting the reactor by additionally charging into said effluent about 300,000 s.c.f.h. of previously cooled reactor effluent gases. Next, the thusly quenched effluent suspension was charged serially through heat exchangers 3 and 4 wherein the temperature thereof was further reduced to about 400° F. The cooled effluent was then sampled substantially immediately downstream from heat exchanger 4 and was analyzed quantitatively for titanium tetrachloride and aluminum chloride and it was determined that about 45 lbs./hour of titanium tetrachloride and about 20 lbs./hour of aluminum chloride were flowing within said cooled effluent. The cooled effluent was then charged into a bag filter apparatus 5 equipped with a repressuring device as previously described and compriisng 6 chambers, each chamber having disposed therein 48 filter bags, each of 6 foot length and 6 inch diameter. The material of construction of said filter bags was a felt matting produced from polytetrafluoroethylene fibers. The design pressure drop across said bag filter was about 5 inches $H_2O$. The pressure drop across the bag filter was then monitored at 25 hour intervals and the results thereof are set forth in Table 2 below. Each filter bag was subjected to the aforedescribed repressuring procedure at a rate of about 60 pulses per hour.

As will be noted, after about 400 hours of continuous operation under these conditions the pressure drop across the bag filter rose substantially. Accordingly, at the end of the aforesaid 400 hour period operations were shut down and the bag filter disassembled and inspected. It was discovered that exterior surfaces 11 of filter bags 10 were substantially occluded or blinded by pigmentary material to the extent that a pigment cake of about ½ inch thickness was present thereon.

TABLE II

| Hours operation: | Pressure drop (inches/H$_2$O) |
|---|---|
| 25 | 3 |
| 50 | 5 |
| 75 | 7 |
| 100 | 4 |
| 125 | 5 |
| 150 | 9 |
| 175 | 5 |
| 200 | 6 |
| 225 | 8 |
| 250 | 7 |
| 275 | 9 |
| 300 | 11 |
| 325 | 10 |
| 350 | 11 |
| 375 | 12 |
| 400 | 12 |

EXAMPLE II

This example is essentially a duplicate of Example I with the exception that water in the form of steam was additionally continuously injected into the pigment laden gas stream subsequent to the final heat exchange apparatus and prior to entry thereof into the bag filter. Accordingly, at a point about 50 feet upstream from bag filter inlet 6 and about 25 feet downstream from heat exchanger 4 steam was injected into the cooled effluent stream at a rate of about 20 lbs./hour of water. Said rate of injection was calculated to represent about 80% of the stoichiometrically required rate for substantially complete hydrolysis of the titanium and aluminum chlorides present in said stream. In Table III below there is presented the pressure drop data realized by accomplishing the collection procedure in accordance with the method of this invention.

TABLE III

| Hours operation: | Pressure drop (inches/H$_2$O) |
|---|---|
| 25 | 3 |
| 50 | 4 |
| 75 | 3 |
| 100 | 4 |
| 125 | 5 |
| 150 | 4 |
| 175 | 5 |
| 200 | 3 |
| 225 | 4 |
| 250 | 6 |
| 275 | 4 |
| 300 | 5 |
| 325 | 6 |
| 350 | 5 |
| 375 | 4 |
| 400 | 5 |

At the end of the 400 hour period operations were shut down and the bag filter apparatus disassembled and inspected. It was found that the filter bags had only a very light caking of pigment thereon having an average thickness of less than about ⅛ inch. Furthermore, after several repeat comparative runs of the procedures of both Example I and the present example, it was found that the average service life of the filter bags was about doubled when water was injected into the cooled reactor effluent in accordance with the process of the present invention.

Obviously, many changes can be made in the above description and examples without departing from the intended scope of the invention. For instance, while the detailed description and examples of the invention have related specifically to bag filtration of pyrogenic titanium dioxide containing gas streams it is clear that the operative principles of the invention are applicable to any filtration process for such streams wherein the pigment-containing gas stream is flowed through a porous material adapted to retain the pigmentary product on one side thereof while the gaseous components flow therethrough.

Moreover, while the above examples specifically disclose a process for the production of titanium dioxide in which aluminum chloride is additionally utilized as an adjuvant it is important to bear in mind that, in accordance with our discovery, the deleterious phenomenon of filter occlusion has been found to be largely attributable to the presence of even trace amounts of titanium halides and/or aluminum halide in the cooled oxidation reaction zone effluent. Therefore, the process of our invention is efficacious provided that at least one of the aforementioned halides form part of the cooled reaction zone effluent.

Accordingly, it is intended that the above disclosure be regarded as illustrative in nature and as in no way limiting the scope of the invention.

What is claimed is:

1. In a process for the separation of titanium dioxide pigment produced by oxidation of a titanium tetrahalide at above about 1450° F. from suspension in by-product gases comprising the steps of cooling said suspension to below about 600° F. and conducting the cooled suspension through a porous filter material adapted to isolate the pigment portion of said suspension on one side thereof while allowing the gaseous components of said suspension to pass therethrough the improvement which comprises injecting water into said suspension at below about 600° F. prior to said filtration step in an amount (1) sufficient to provide at least about 50% of the stoichiometric equivalent for reaction by hydrolysis with the amounts of titanium and aluminum halides present in said suspension, and (2) insufficient to cause substantial further cooling of said suspension.

2. The process of claim 1 wherein the amount of water injected into said suspension represents at least about 80% of the stoichiometric requirement for reaction by hydrolysis with said titanium and aluminum halides.

3. The process of claim 1 wherein the titanium tetrahalide oxidized to form said titanium dioxide pigment is titanium tetrachloride.

4. The process of claim 1 wherein in the oxidation reaction there is additionally charged to the reaction zone an aluminum halide adjuvant.

5. The process of claim 1 wherein said water is injected into said suspension in vapor form.

References Cited

UNITED STATES PATENTS

| 2,394,633 | 2/1946 | Pechukas et al. | 23—202 |
| 2,721,626 | 10/1955 | Rick | 23—202 XR |
| 2,899,278 | 8/1959 | Lewis | 23—202 |
| 2,909,409 | 10/1959 | Gregory | 23—202 |
| 2,990,249 | 6/1961 | Wagner | 23—202 XR |
| 3,224,215 | 12/1965 | Bramekamp et al. | 23—202 XR |
| 3,310,377 | 3/1967 | Stern et al. | 23—202 |

EDWARD STERN, Primary Examiner

U.S. Cl. X.R.

55—71; 106—300